(12) United States Patent
Vogman

(10) Patent No.: US 6,487,093 B1
(45) Date of Patent: Nov. 26, 2002

(54) VOLTAGE REGULATOR

(75) Inventor: Viktor D. Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 09/603,225

(22) Filed: Jun. 26, 2000

(51) Int. Cl.[7] .............................................. H02M 3/335
(52) U.S. Cl. ...................................................... 363/21.02
(58) Field of Search ............................... 363/21, 20, 16, 363/17, 97, 89, 98, 131, 132; 323/222, 282

(56) References Cited

U.S. PATENT DOCUMENTS 5,386,359 A * 1/1995 Nochi ..................... 363/21.01
5,694,392 A * 12/1997 Faulk ......................... 363/16
5,929,606 A * 7/1999 Faulk ......................... 320/143
5,982,638 A * 11/1999 Tang et al. .................... 363/21

* cited by examiner

Primary Examiner—Rajnikant B. Patel
(74) Attorney, Agent, or Firm—Trop, Pruner & Hu, P.C.

(57) ABSTRACT

A voltage regulator includes a transformer, a plurality of output stages and at least one switch. The transformer has a primary side and a secondary side, and the switch(es) are coupled to the primary side of the transformer to open and close to transfer energy to the transformer. The output stages are coupled to the secondary side of the transformer to receive energy from the transformer and provide output voltages. The output stages prevent current from flowing through the switch(es) during time intervals in which the switch(es) transition from being open to being closed.

44 Claims, 9 Drawing Sheets

VOLTAGE REGULATOR

BACKGROUND

The invention generally relates to a voltage regulator, such as switching voltage regulator, for example.

A DC-to-DC voltage regulator typically is used to convert a DC input voltage to either a higher or a lower DC output voltage. One type of voltage regulator is a switching regulator that is often chosen due to its small size and efficiency. The switching regulator typically includes one or more switches that are rapidly opened and closed to transfer energy between an inductor (a stand-alone inductor or a transformer, as examples) and an input voltage source in a manner that regulates an output voltage.

As an example, referring to FIG. 1, one type of switching regulator is a synchronous Buck switching regulator 10 that receives an input DC voltage (called $V_{IN}$) and converts the $V_{IN}$ voltage to a lower regulated output voltage (called $V_{OUT}$) that appears at an output terminal 11. To accomplish this, the regulator 10 may include a switch 20 (a metal-oxide-semiconductor field-effect-transistor (MOSFET), for example) that is operated (via a voltage called $V_{SW}$) in a manner to regulate the $V_{OUT}$ voltage, as described below.

Referring also FIGS. 2 and 3, in particular, the switch 20 opens and closes to control energization/de-energization cycles 19 (each having a constant duration called $T_S$) of an inductor 14. In each cycle 19, the regulator 10 asserts, or drives high, the $V_{SW}$ voltage during an on interval (called $T_{ON}$) to close the switch 20 and transfer energy from an input voltage source 9 to the inductor 14. During the $T_{ON}$ interval, a current (called $I_L$) of the inductor 14 has a positive slope. During an off interval (called $T_{OFF}$) of the cycle 19, the regulator 10 deasserts, or drives low, the $V_{SW}$ voltage to open the switch 20 and isolate the input voltage source 9 from the inductor 14. At this point, the level of the $I_L$ current is not abruptly halted, but rather, a diode 18 begins conducting to transfer energy from the inductor 14 to a bulk capacitor 16 and a load (not shown) that are coupled to the output terminal 11. During the $T_{OFF}$ interval, the $I_L$ current has a negative slope, and the regulator 10 may close a switch 21 to shunt the diode 18 to reduce the amount of power that is otherwise dissipated by the diode 18. The bulk capacitor 16 serves as a stored energy source that is depleted by the load, and additional energy is transferred from the inductor 14 to the bulk capacitor 16 during each $T_{ON}$ interval.

For the Buck switching regulator, the ratio of the $T_{ON}$ interval to the $T_S$ interval, called a duty cycle, generally governs the ratio of the $V_{OUT}$ to the $V_{IN}$ voltages. Thus, to increase the $V_{OUT}$ voltage, the duty cycle may be increased, and to decrease the $V_{OUT}$ voltage, the duty cycle may be decreased.

As an example, the regulator 10 may include a controller 15 (see FIG. 1) that regulates the $V_{OUT}$ voltage by using a pulse width modulation (PWM) technique to control the duty cycle. In this manner, the controller 15 may include an error amplifier 23 that amplifies the difference between a reference voltage (called $V_{REF}$) and a voltage (called $V_P$ (see FIG. 1)) that is proportional to the $V_{OUT}$ voltage. Referring also to FIG. 5, the controller 15 may include a comparator 26 that compares the resultant amplified voltage (called $V_C$) with a sawtooth voltage (called $V_{SAW}$) and provides the $V_{SW}$ signal that indicates the result of the comparison. The $V_{SAW}$ voltage is provided by a sawtooth oscillator 25 and has a constant frequency (i.e., $1/T_S$).

Due to the above-described arrangement, when the $V_{OUT}$ voltage increases, the $V_C$ voltage decreases and causes the duty cycle to decrease to counteract the increase in $V_{OUT}$. Conversely, when the $V_{OUT}$ voltage decreases, the $V_C$ voltage increases and causes the duty cycle to increase to counteract the decrease in $V_{OUT}$.

Significant power losses of the regulator 10 may be attributable to the power that is dissipated by the switch 20. Ideally, the product of a voltage (called $V_C$) across the switch 20 and a current (called $I_{IN}$) through the switch 20 should be zero because $V_1$ is ideally zero when the switch 20 is closed, and $I_{IN}$ is ideally zero when the switch is open. However, referring to FIGS. 4 and 6, significant switching losses typically occur in a time interval 30 when the switch 20 transitions from the closed state to the open state and a time interval 31 in which the switch 20 transitions from the open state to the closed state due to the overlapping nonzero $V_1$ voltage and $I_{IN}$ current during the time intervals 30 and 31. A snubber circuit may be used for purposes of reducing the level of the $V_1$ voltage (to reduce power losses) during the time intervals 30 and 31. However, the snubber circuit typically reduces the efficiency of the regulator 10.

Also contributing to power losses across a switch (especially a switch that is coupled to a transformer) of a given regulator may be a voltage spike that occurs across the switch when the switch turns off. Besides introducing switching power losses, the voltage spike may also reduce the lifetime of the switch. Typically, the voltage spike is attributable to leakage inductances in the regulator. In this manner, when the switch opens, the currents through the effective leakage inductor is abruptly halted, giving rise to the voltage spike. A snubber circuit may be used for purposes of dampening the magnitude of the voltage spike. However, the snubber circuit may reduce the efficiency of the regulator.

For purposes of converting an AC wall voltage into regulated DC voltages for components 2 (see FIG. 1) of a computer system 1, the regulator 10 may form the second of three stages of a power supply 3 for the computer system 1. A boost switching converter, or voltage regulator 7, may be used for the first stage. The boost voltage regulator 7 converts a rectified AC input voltage (received via input lines 5) into a high DC voltage and shapes the input line current making its harmonic content compliant with various standards. The regulator 10 may be used to convert the high DC voltage that is generated by the boost voltage regulator 7 into comparatively low, isolated and regulated DC voltages (12V, 3.3V and 5V DC voltages, as examples) for power distribution in the computer system 1. The third stage may be a DC-to-DC isolated voltage regulator, typically called a voltage regulator module (VRM), that converts the DC voltages that are furnished by the regulator 10 into lower voltages (1.2V to 2V voltages, as examples) that the VRM 17 tightly regulates and provides via power distribution lines 19 to the components 2 of the computer system 1. Unfortunately, the above-described three stage design may introduce inefficiency; introduce reliability and size problems; and add significant costs that are associated with the power supply 3.

Thus, there is a continuing need for an arrangement that addresses one or more of these problems.

DETAILED DESCRIPTION

Figure 1:
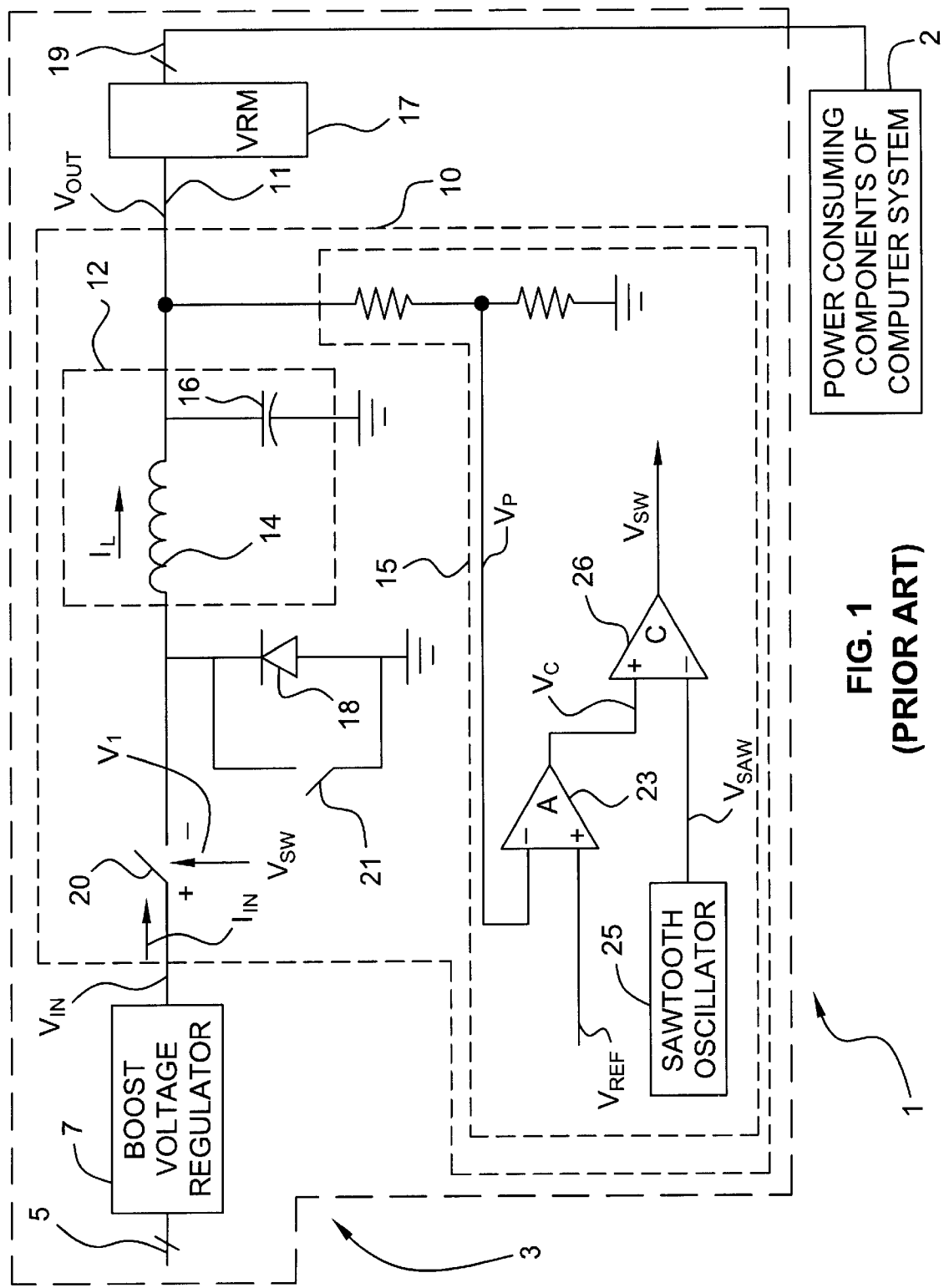
FIG. 1 is a schematic diagram of a power supply for a computer system according to the prior art.
Figures 2, 3, 4, 5, 6:
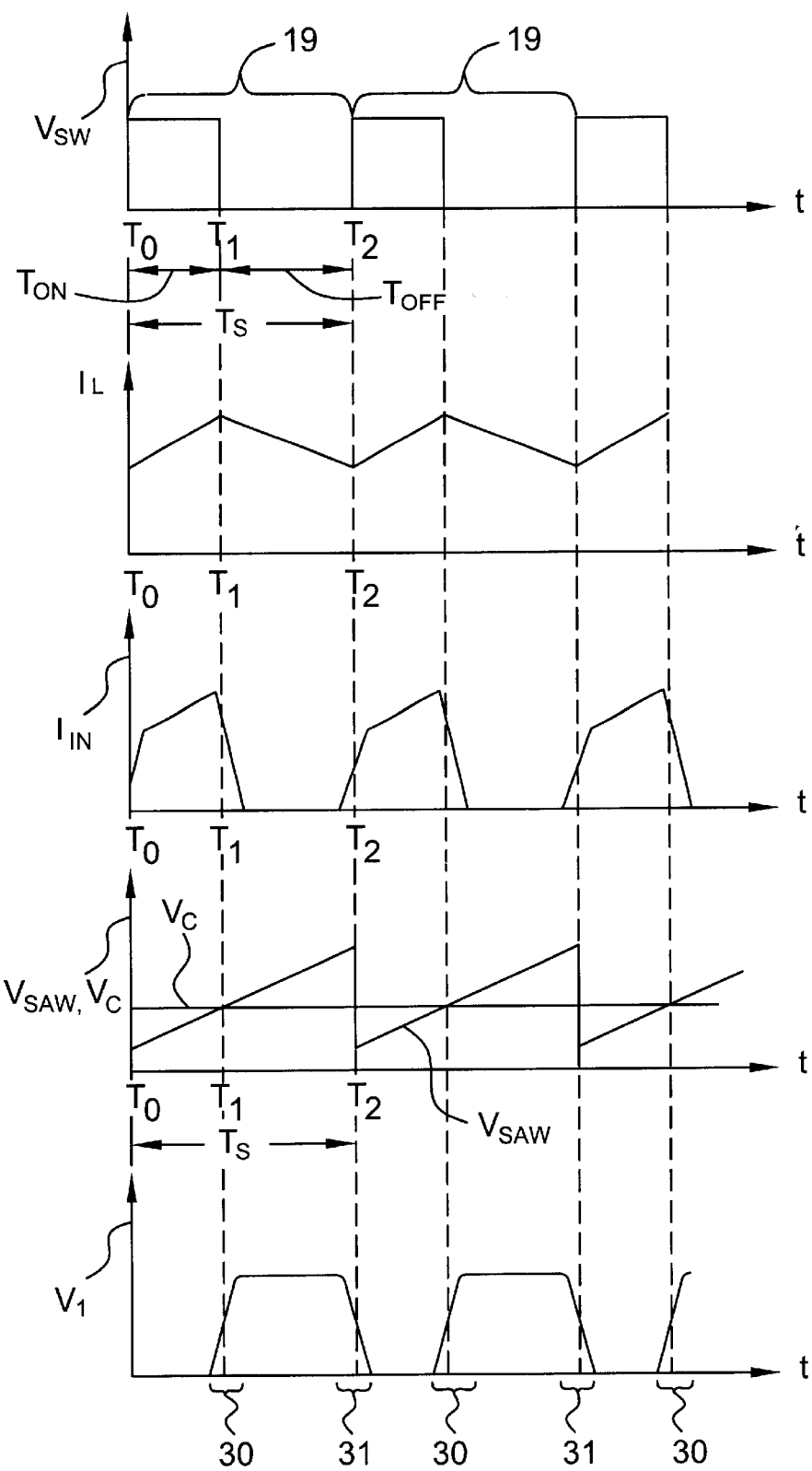
FIGS. 2, 3, 4, 5, and 6 are signal waveforms of a regulator of the power supply of FIG. 1 of the prior art.
Figure 7:
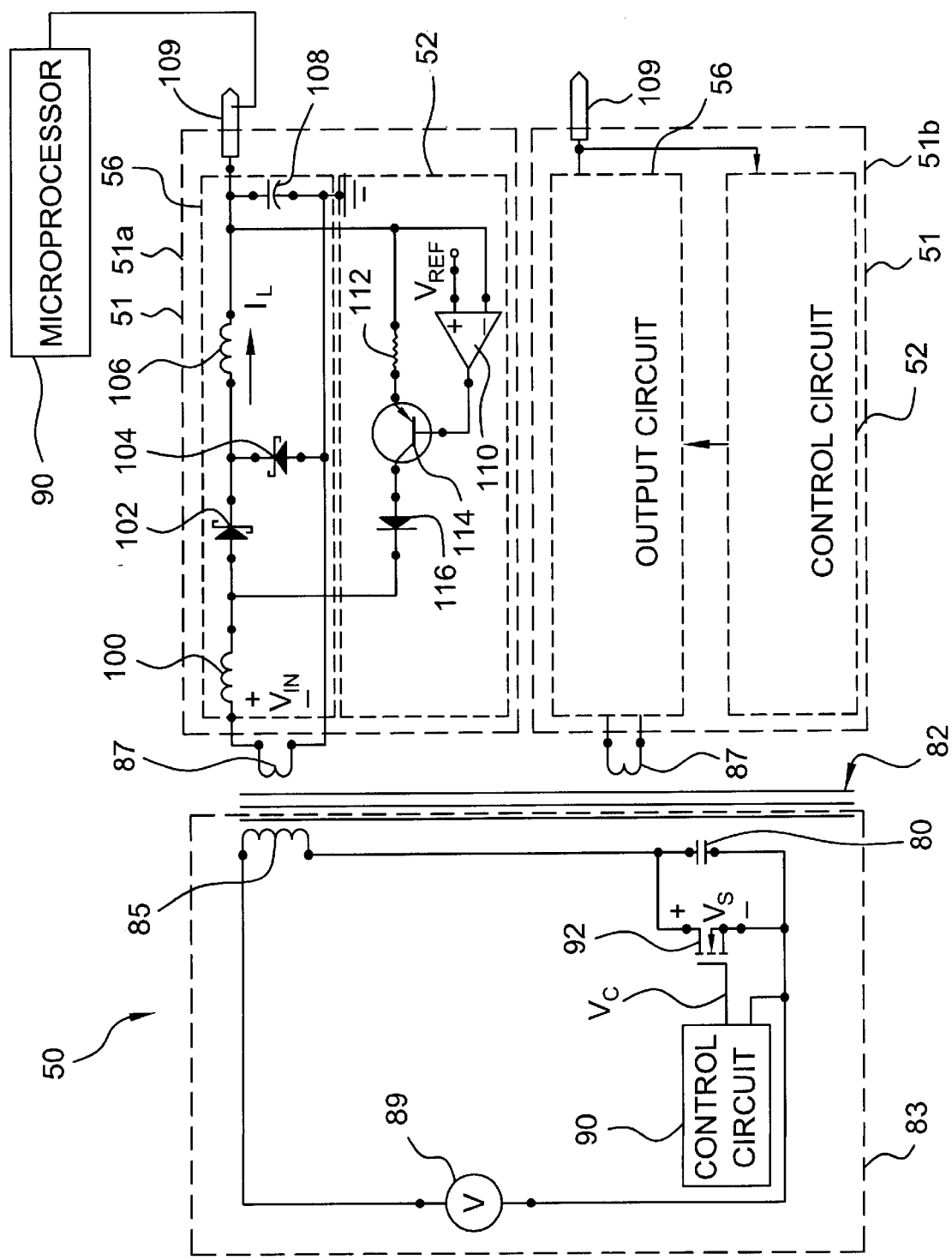
FIG. 7 is a schematic diagram of a voltage regulator according to an embodiment of the invention.
Figure 8:
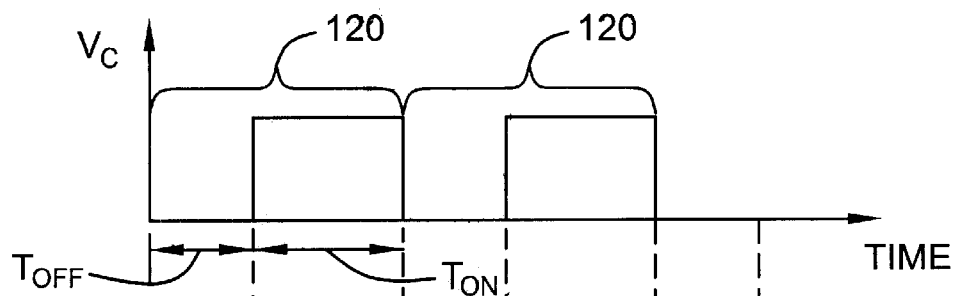
FIGS. 8, 9, 10, 11, 12 and 13 are signal waveforms of the regulator of FIG. 7 according to an embodiment of the invention.

Referring to FIG. 7, an embodiment of a switching voltage regulator 50 in accordance with the invention includes a switch, such as a metal-oxide-semiconductor field-effect-transistor (MOSFET) 92, that is controlled by a switching control circuit 90 of the regulator 50. The switching control circuit 90 operates the MOSFET 92 to transfer energy from an input voltage source 89, through a transformer 82 and to output stages 51 (output stages 51a and 51b shown as examples) to produce DC output voltages at output terminals 109 of the output stages 51. In this manner, the control circuit 90 furnishes a control voltage (called $V_C$) that alternates between low and high voltage states in each switching cycle 120 (see FIG. 8) to regulate operation of the MOSFET 92. The MOSFET 92 closes, or conducts, when the $V_C$ voltage is high (during a $T_{ON}$ interval) to transfer energy from the input voltage source 89 to the output stages 51 (via the transformer 82), and the MOSFET 92 opens, or does not conduct, when the $V_C$ voltage is low (during a $T_{OFF}$ interval).

Thus, the output stages 51 generally conduct current during the $T_{ON}$ intervals. However, as described below, during an initial subinterval (called a $T_B$ interval) of each $T_{ON}$ interval, none of the output stages 51 conduct current, a condition that prevents drain-source current (called $I_S$ and depicted FIG. 10) from flowing through the MOSFET 92 during the $T_B$ intervals. Therefore, when the MOSFET 92 transitions between open and closed states, there is effectively no overlapping Is drain-source current and drain-source voltage (called $V_S$ and depicted in FIG. 9) of the MOSFET 92. Furthermore, when the MOSFET 92 transitions states between the $T_{ON}$ and $T_{OFF}$ time intervals, a capacitor 80 of the regulator 50 keeps the $V_S$ drain-source voltage near a ground voltage level during an initial subinterval (called a $T_C$ interval) of the $T_{OFF}$ time interval. Therefore, when the MOSFET 92 transitions between closed and open states, there is approximately no overlapping Is drain-source current and $V_S$ drain-source voltage.

As a result of $T_B$ and $T_C$ subintervals, approximately no power is dissipated by the MOSFET 92, as the product of the $V_S$ voltage and Is current is always approximately zero. Therefore, due to these features, the regulator 50, as compared to a conventional switching regulator, may dissipate less heat and thus, may require a much smaller heatsink; may be more efficient; and a higher switching frequency may be used with the regulator 50, thereby reducing the sizes of components of the regulator 50. Other and different advantages are possible.

In some embodiments of the invention, the regulator 50 may provide one or more voltages to components of a computer system. For example, the regulator 50 may provide one or more supply voltages to a processor (a microprocessor 90, for example) of a computer system for purposes of powering the processor.

Referring to the regulator 50 now in more detail, in some embodiments of the invention, the transformer 82 includes a primary winding 85 that is coupled to an input stage 83 and secondary windings 87. Each secondary winding 87 is coupled to a different output stage 51. It is noted that only the output stage 51a is depicted in detail in FIG. 7 for purposes of simplifying its description. However, the other output stages 51 may each have a similar design.

The input stage 83 includes the MOSFET 92 that has its drain terminal coupled to one terminal of the primary winding 85 and one terminal of the capacitor 80. The other terminal of the capacitor 80 and the source terminal of the MOSFET 92 are both coupled to primary side ground. The other terminal of the primary winding 85 is coupled to the positive terminal of the input voltage source 89 that has its negative terminal coupled to primary side ground. The voltage source 89 may be, as an example, one or more rectifier stages and/or one or more regulator stages that convert an AC voltage into a DC input voltage for the regulator 50. In some embodiments of the invention, the regulator 50 converts the DC input voltage into lower regulated DC output voltages that appear on the output terminals 109 of the output stages 51.

The output stage 51 includes an output circuit 56 that is regulated by an associated control circuit 52 (of the output stage 51) to produce a regulated voltage at the output terminal 109. The output circuit 56 includes a blocking circuit to block current (and energy) from flowing from the secondary winding 87 into the output circuit 56 during the $T_B$ blocking interval. To accomplish this, in some embodiments of the invention, this blocking circuit includes a magnetic amplifier, or coil 100, that blocks the current flow into the output circuit 56 during the $T_B$ blocking interval, as described below. When the coil 100 blocks the current, a diode 102 isolates, or decouples, the coil 100 and the secondary winding 87 from the remaining part of the output circuit 56.

In some embodiments of the invention, one terminal of the coil 100 is coupled to a terminal of the secondary winding 87, and the other terminal of the secondary winding 87 is coupled to secondary side ground. The other terminal of the coil 100 is coupled to the anode of the diode 102 to the remaining circuitry of the output circuit 56.

In some embodiments of the invention, the coil 100 behaves in the following manner. The switching action of the MOSFET 92 produces a voltage (called $V_W$ and depicted in FIG. 13) across the primary winding 87. In this manner the $V_W$ voltage has a positive voltage level and is generally square shaped when the MOSFET 92 conducts during the $T_{ON}$ time interval, and the $V_W$ voltage has a negative voltage level during the $T_{OFF}$ time interval and assumes a general sinusoidal shape when the MOSFET 92 does not conduct. An area 190 between the $V_W$ voltage waveform and the zero volt line during the $T_{ON}$ time interval equals an area 192 between the $V_W$ voltage waveform and the zero volt line during the $T_{OFF}$ time interval. The coil 100 is biased by the control circuit 52 so that the coil 100 represents a very high impedance when the $V_W$ voltage transitions from its low to high levels. This high impedance, in turn, blocks the $V_W$ voltage from propagating to the rest of the output circuit 56. The $T_B$ blocking time may be described by the following equation:

$$T_B = NAe \frac{(Bs - B1)}{V_P}$$

where "N" represents the number of turns of the coil 100; "Ae" represents the effective cross-sectional area of the coil 100; "$B_s$" represents the saturation flux density of the coil 100; "B1" represents the starting point in flux density of the coil 100 (established by the control circuit 52); and "$V_P$" represents the $V_W$ voltage during the $T_{ON}$ interval. After the expiration of the $T_A$ time interval, the coil 100 saturates and turns into a low impedance path that passes the $V_W$ voltage to the remaining part of the output circuit 56.

Among the other features of the output circuit 56, the output circuit 56 includes the diode 102 that has an anode that is coupled to one terminal of the coil 100 (as described above) and a cathode that is coupled to a terminal of an inductor 106 and a cathode of a diode 104 (both of the output circuit 56). The anode of the diode 104 is coupled to the secondary side ground. The other terminal of the inductor 106 is coupled to an output terminal of the output circuit 56, and a bulk capacitor 108 (of the output circuit 56) is coupled between the output terminal and the secondary side ground.

Figure 11:
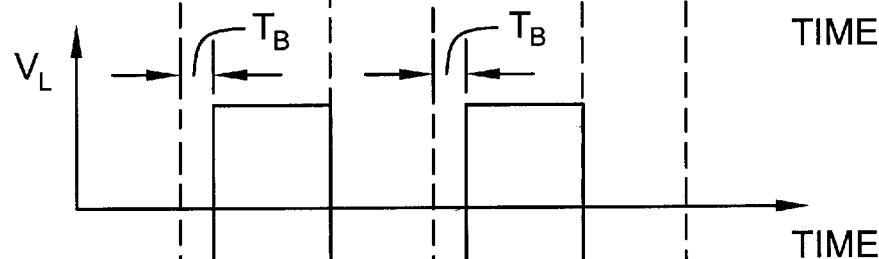
Figure 12:
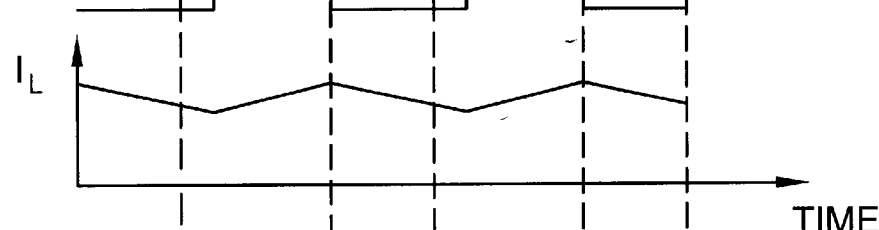

Due to this arrangement, the output circuit 56 operates in the following manner. During the $T_{ON}$ time interval but after the $T_B$ time interval, a voltage (called $V_L$ and depicted in FIG. 11) across the inductor 106 is approximately equal to the difference between the $V_W$ voltage and the output voltage (of the output circuit 56) that appears at the output terminal 109. During this time interval, the diode 104 is reverse biased and thus, does not conduct, thereby allowing energy to be transferred from the secondary winding 87 to the inductor 106. Furthermore, during this time interval, a current (called $I_L$, having the orientation shown in FIG. 7 and having a waveform that is depicted in FIG. 12) of the inductor 106 ramps in an upward direction. At the end of the $T_{ON}$ time interval, the MOSFET 92 no longer conducts, a condition that reverses the polarity of the inductor voltage $V_L$ and causes the diode 104 to conduct to transfer energy to the output terminal of the output circuit 56 during the $T_{OFF}$ time interval. The $I_L$ current has a negative slope during the $T_{OFF}$ time interval.

The control circuit 52, in some embodiments of the invention, is an analog circuit that regulates a bias current that is supplied to the coil 100 for purposes of regulating the output voltage of the output circuit 56. In this manner, by regulating the level of this bias current, the control circuit 52 regulates the starting point flux density B1 to, in turn, regulate the duration of the $T_B$ blocking interval. Thus, the control circuit 56 adjusts the bias current that it supplies to the coil 100 to adjust the duty cycle of the signals (the $V_L$ voltage, for example) in the output circuit 56 to, in turn, adjust the level of the output voltage. For example, to increase the output voltage, the control circuit 56 increases the duty cycle by increasing the bias current to increase the B1 starting point flux to decrease the $T_B$ blocking time. For purposes of decreasing the output voltage, the control circuit 56 decreases the duty cycle by decreasing the bias current to decrease the B1 starting point flux to increase the $T_B$ blocking time.

In some embodiments of the invention, the control circuit 52 may include a PNP bipolar junction transistor 114 that has its emitter terminal coupled to one terminal of a current limiting resistor 112. The other terminal of the resistor 112 is coupled to the output terminal 109. The collector terminal of the transistor 114 is coupled to the anode of a diode 116, and the cathode of the diode 116 is coupled to the anode of the diode 102. The base terminal of the transistor 114 is coupled to the output terminal of an amplifier 110 (an operational amplifier, for example) that receives a reference voltage at the non-inverting input terminal of the amplifier 110. The inverting input terminal of the amplifier 110 is coupled to the output terminal 109. Therefore, due to the above-described arrangement, the level of the bias current that the control circuit 56 provides to the coil 100 varies directly with the output voltage of the output circuit 56.

Figure 9:
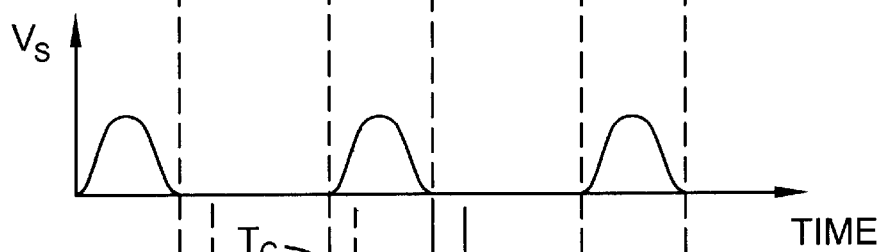
Figure 10:
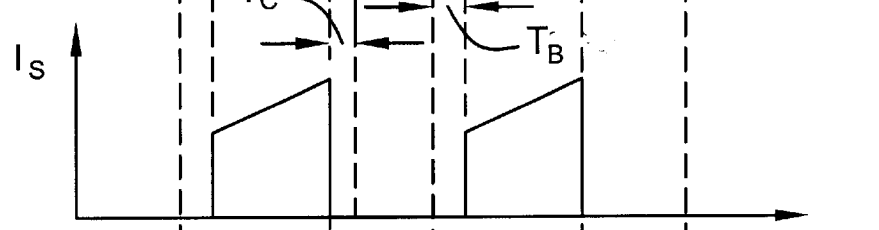

Turning now to the input stage 83 of the regulator 50, after the MOSFET 92 opens, or ceases to conduct (to being the $T_{OFF}$ time interval), the capacitor 80 begins to charge due to the transfer of stored energy from the primary winding. 85 to the capacitor 80 and from leakage inductances of the transformer 82. The charging of the capacitor 80 causes the $V_S$ voltage (i.e., the voltage across the capacitor 80) to increase, as depicted in FIG. 9. After peaking, the capacitor 80 discharges and transfers energy to the primary winding 85, an event that causes the $V_S$ voltage to decline, as depicted in FIG. 9. At a time characterized by the inductance of the primary winding 85 and the capacitance of the capacitor 94, the $V_S$ voltage reaches approximately zero volts. Although the $V_S$ voltage may have a tendency to go negative, the body diode of the MOSFET 92 clamps the $V_S$ voltage near zero volts.

When the MOSFET 92 transitions states from the $T_{ON}$ to the $T_{OFF}$ interval, the capacitor 80 dampens the rise of the $V_S$ voltage and receives current from leakage inductances to avoid voltage spikes across the MOSFET 92, and this stored energy is later transferred to the load (coupled to the output terminal 109). Because the $V_S$ voltage is near zero volts (and thus, stores not energy) during the $T_{ON}$ interval when energy is being transferred from the input voltage source 89 to the transformer 82, the capacitance of the capacitor 80 may be quite high without degrading the performance of the regulator 50.

Figure 14:
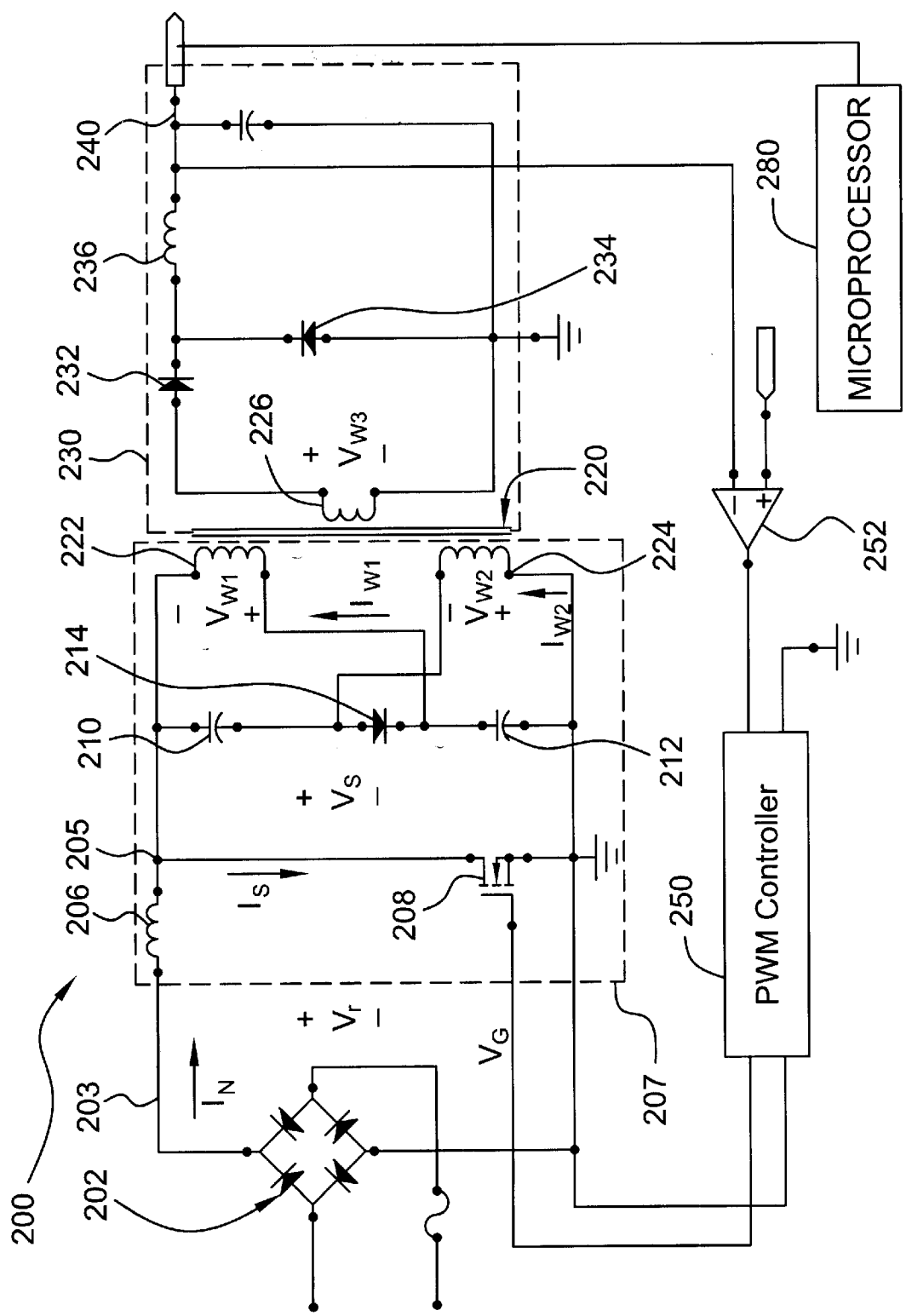
FIG. 14 is a schematic diagram of a voltage regulator according to an embodiment of the invention.

FIG. 14 depicts a switching regulator 200 that has features to limit the voltage across switch of the regulator 200. The regulator 200 includes a primary side circuit 207 that is coupled to the primary side of a transformer 220 and an output stage, or secondary side circuit 230, that is coupled to the secondary side of the transformer 220. The primary side circuit 207 receives a voltage (at its input terminal 203) that is the product of a rectified AC voltage. The DC component of this voltage is represented by "Vr" in FIG. 14. The secondary side circuit 230 provides an output voltage (called $V_{OUT}$) at an output terminal 240 of the regulator 200.

Figure 18:
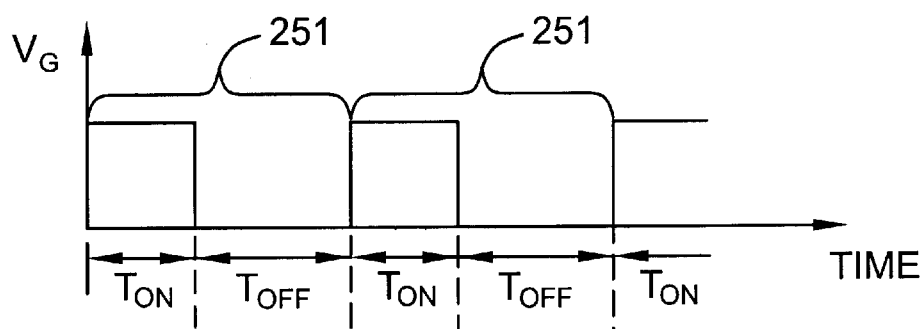
FIGS. 18, 19, 20, 21, 22, 23, 24, 25 and 26 are signal waveforms of the regulator of FIG. 14 according to an embodiment of the invention.

For purposes of generating and regulating the $V_{OUT}$ voltage, the primary side circuit 207 includes a switch, such as a MOSFET 208, that is operated by a pulse width modulated (PWM) controller 250 to control the flow of energy from the primary side circuit 207, through the transformer 220 and to the secondary side circuit 230. In this manner, the controller 250 provides a control voltage (called $V_G$ and depicted in FIG. 18) that the controller 250 asserts (drives high, for example) to cause the MOSFET 208 to close, or conduct, and establish a $T_{ON}$ time interval in which energy is stored in the inductor 206. The controller 250 de-asserts (drives low, for example) the $V_G$ voltage to cause the MOSFET 208 to open, or cease conducting, for purposes of establishing a $T_{OFF}$ time interval in which energy is transferred from the inductor 206 to the transformer 220. The primary side circuit 207 also includes capacitors 210 and 212 that store energy from leakage inductance of the transformer 220 and place a limit on the voltage across the MOSFET 208 during the $T_{OFF}$ interval when the MOSFET 208 does not conduct, as described below.

More specifically, in some embodiments of the invention, the primary circuit 207 includes a full-wave bridge rectifier 202 that rectifies an AC voltage to produce a voltage that has a DC component (called Vr) that is provided to the input terminal 203. The inductor 206 has one terminal that is coupled to the input terminal 203 and another terminal that is coupled to a node 205. The drain terminal of the MOSFET 208 is coupled to the node 205, and the source terminal of the MOSFET 208 is coupled to primary side ground. The gate terminal of the MOSFET 208 receives the $V_G$ voltage.

Figure 13:
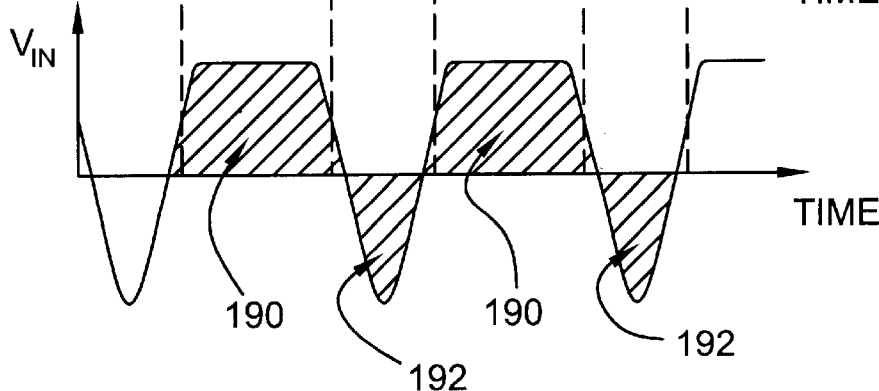

The transformer 220 includes two primary windings 222 and 224 that have the orientations that are depicted in FIG. 13. One terminal of the primary winding 222 is coupled to the node 205, and the other terminal of the primary winding 222 is coupled to the cathode of a diode 214. One terminal of the primary winding 224 is coupled to primary side ground, and the other terminal of the primary winding 224 is coupled to the anode of the diode 214. One terminal of the capacitor 210 is coupled to the node 205, and the other terminal of the capacitor 210 is coupled to the anode of the diode 214. One terminal of the capacitor 212 is coupled to the cathode of the diode 214, and the other terminal of the capacitor 210 is coupled to primary side ground.

Figure 15:
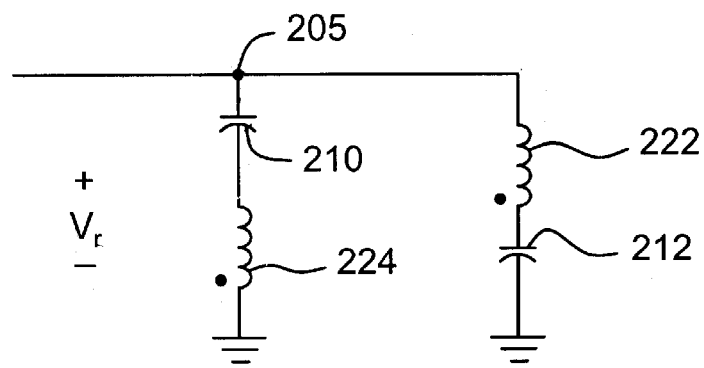
FIGS. 15, 16 and 17 are schematic diagrams illustrating operation of the regulator of FIG. 14 according to an embodiment of the invention.

Thus, due to the above-described arrangement, the regulator 200 behaves in the following fashion. Referring to FIGS. 14 and 15, when the AC wall voltage is first connected to the primary side circuit 207 and before the MOSFET 208 begins switching on and off, the DC Vr voltage is applied across both the capacitors 210 and 212. In this manner, the series combination of the capacitor 210 and the primary winding 224 is coupled between the node 205 and primary side ground; and the series combination of the capacitor 212 and the primary winding 222 is also coupled between the node 205 and primary side ground. It is to be noted that before the MOSFET 208 begins switching on and off, the resistances (i.e. the DC resistances) of the primary windings 222 and 224 and the inductor 206 are negligible. Therefore, each of the capacitors 210 and 212 charge until each of their voltages is near the Vr DC voltage.

Figure 16:
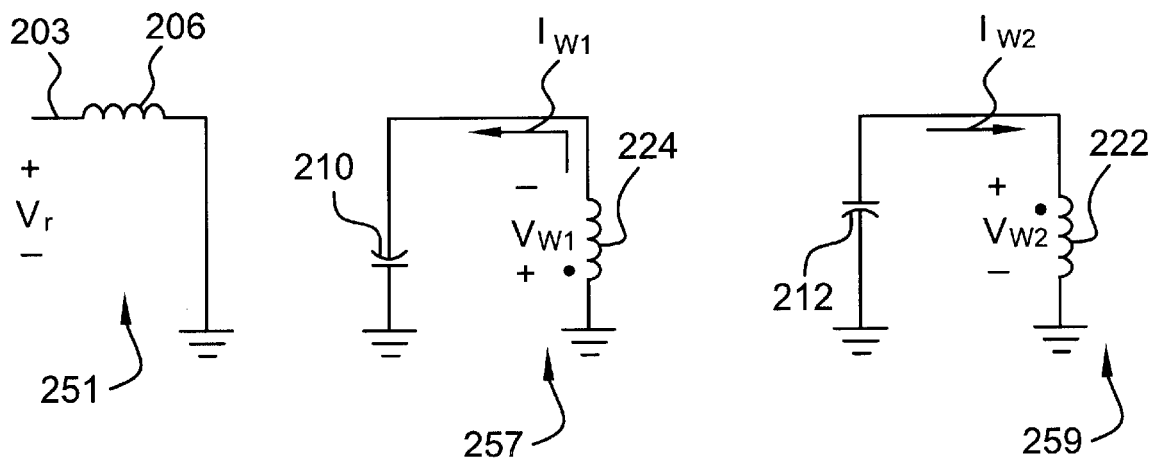

When the controller 250 begins opening and closing the MOSFET 208, the primary circuit 207 operates as follows. Referring to FIGS. 14 and 16, during the $T_{ON}$ interval, the MOSFET 92 conducts, as depicted by a drain-source current (called $I_s$ and having the waveform shown in FIG. 24) that has the orientation shown in FIG. 14. The conduction of the, MOSFET 208 couples the node 205 to ground to produce three separate circuits 251, 257 and 259 that are depicted in FIG. 16. During $T_{ON}$ interval, the diode 214 is reverse biased and does not conduct. In this manner, the MOSFET 208 couples the node 205 to primary side ground during the $T_{ON}$ interval to couple the inductor 206 between the input terminal 203 and primary side ground to transfer energy into the inductor 206, as depicted in the circuit 251.

Figure 19:
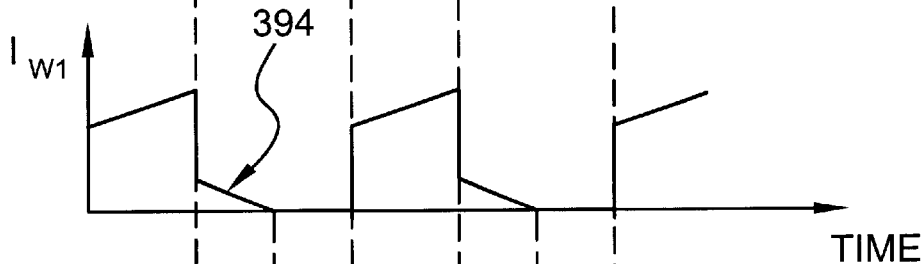
Figure 20:
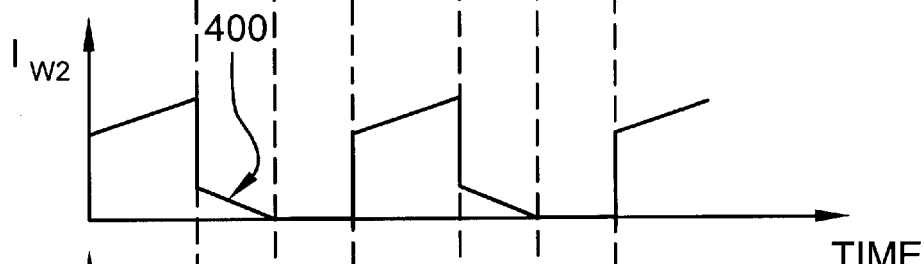
Figure 21:
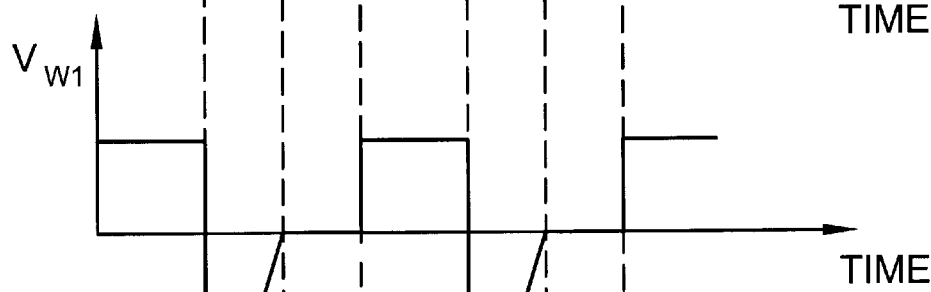

In the circuit 257, the primary winding 224 and the capacitor 210 are coupled in parallel to transfer stored energy in the capacitor 210 into the primary winding 224. In this manner, a voltage (called $V_{W1}$, having an orientation that is depicted in FIG. 16 and having a waveform that is depicted in FIG. 21) of the primary winding 224 has a positive voltage level, and a-current (called $I_{w1}$, having an orientation that is depicted in FIG. 16 and having a waveform that is depicted in FIG. 19) of the primary winding 224 ramps upwardly during the $T_{ON}$ interval. In the circuit 259, the primary winding 222 and the capacitor 212 are coupled in parallel to transfer stored energy from the capacitor 212 to the primary winding 222. In this manner, a voltage (called $V_{W2}$, having an orientation that is depicted in FIG. 16 and having a waveform that is depicted in FIG. 21) of the primary winding 222 has a positive voltage level. A current (called $I_{W2}$, having an orientation that is depicted in FIG. 16 and having a waveform that is depicted in FIG. 20) of the primary winding 224 ramps upwardly during the $T_{ON}$ interval. A voltage (called $V_{W3}$ and depicted in FIG. 26) across the secondary winding 226 has a negative voltage level during the $T_{ON}$ interval.

Figure 17:
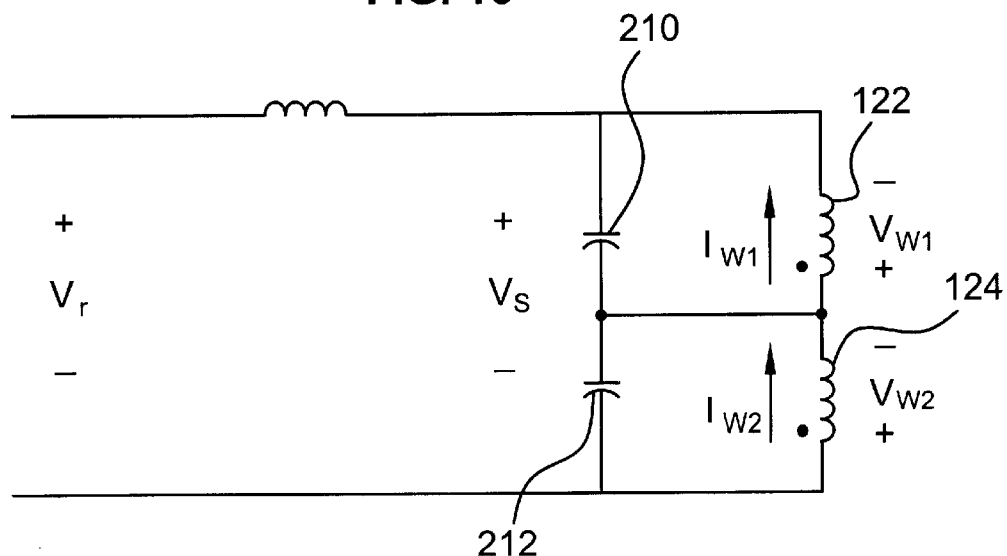
Figure 22:
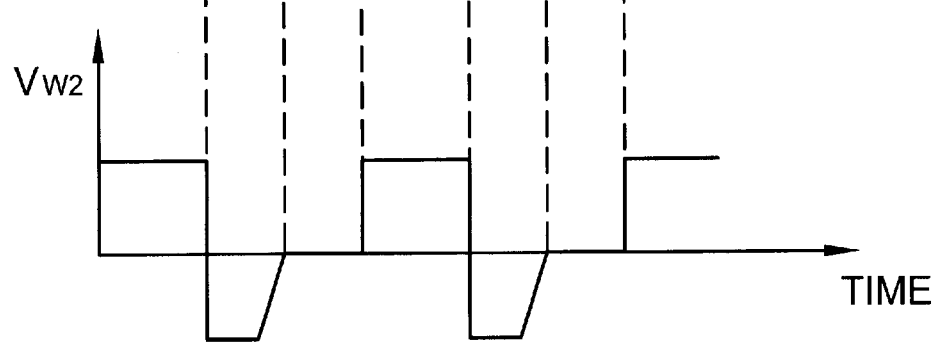
Figure 23:
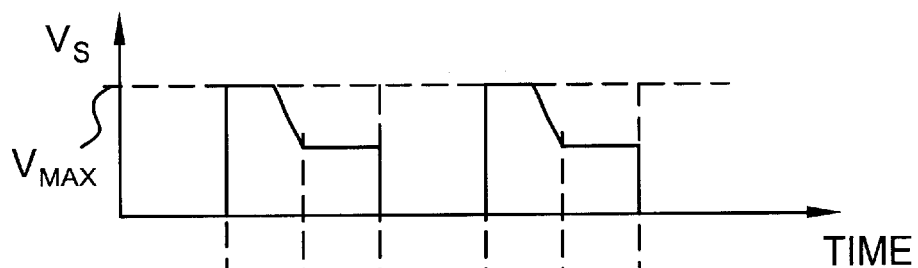
Figure 24:
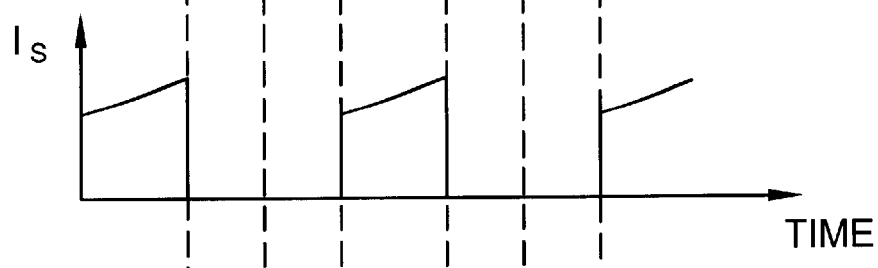
Figure 25:
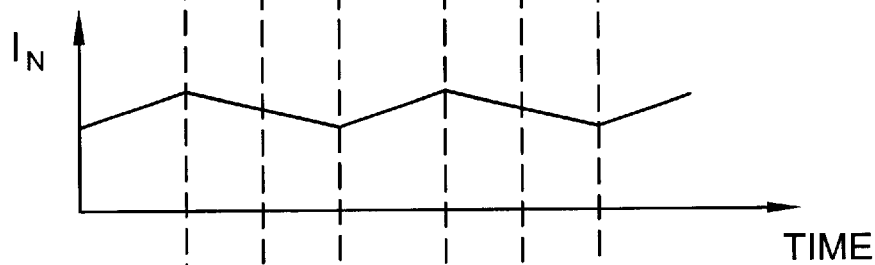
Figure 26:
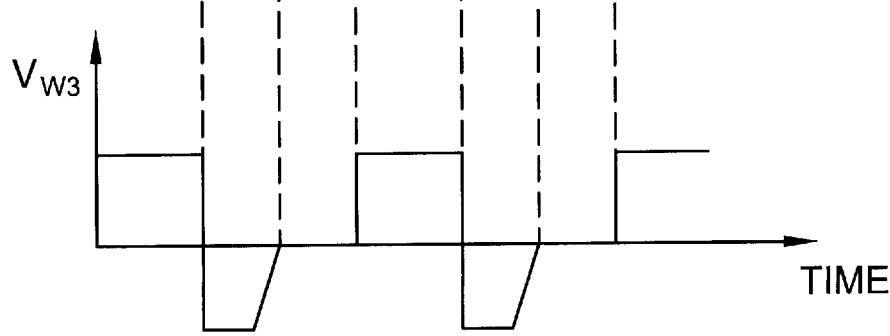

Referring to FIGS. 14 and 17, during the $T_{OFF}$ interval, the MOSFET 92 does not conduct (i.e., the $I_S$ current is near the zero level as depicted in FIG. 24) and the diode 214 is no longer reverse biased and thus, conducts. As a result, the circuit that is depicted in FIG. 17 is formed to transfer stored energy from the primary windings 222 and 224 and the inductor 206 to the capacitors 210 and 212. In this circuit, capacitors 210 and 212 are coupled in parallel with the primary windings 222 and 224, respectively, and the polarities of the voltages $V_{W1}$ and $V_{W2}$ reverse to both become negative, as depicted in FIGS. 21 and 22. During the $T_{OFF}$ interval, energy is transferred from the inductor 206 and primary windings 222 and 224 into the capacitors 210 and 212. As depicted in FIGS. 19 and 20, the $I_{W1}$ and $I_{W2}$ have slight magnetizing current components (from the transformer 220) labeled as 394 and 420, respectively, during the $T_{OFF}$ intervals. Energy is also transferred from the transformer 220 (via the secondary winding 226) to the secondary side circuit 230 if a flyback output stage (see FIG. 27) is used. As depicted in FIGS. 19, 20 and 25, the $I_{W1}$, $I_{W2}$ currents and an input current (called IN) ramp downwardly during the $T_{OFF}$ interval. Referring also to FIG. 26, the $V_{W3}$ voltage across the secondary winding 226 has a negative voltage level during the $T_{OFF}$ interval due to the polarity changes across the primary windings 222 and 224. Referring to FIGS. 14 and 25, the $I_N$ input current that flows into the input terminal 203 is never halted. In this manner the $I_N$ input current either flows either through the path created by the inductor 206 during the $T_{ON}$ interval or through the path created by the capacitors 210 and 212 and diode 214 during the $T_{OFF}$ interval. As a result of this continuous conduction, the conduction angle of the regulator 200 is expanded (relative to conventional topologies), and the power factor is increased. Furthermore, the energy that is stored in leakage inductance of the transformer 220 is supplied to the capacitors 210 and 212 unlike conventional regulators that use snubber circuits. Therefore, this feature increases the efficiency of the regulator 200.

In some embodiments of the invention, the output stage 230 includes a diode 232 that is has its anode coupled to one terminal of the secondary winding 126. The other terminal of the secondary winding 126 is coupled to secondary side ground. The cathode of the diode 232 is coupled to the cathode of a diode 234. The anode of the diode 234 is coupled to secondary side ground. An inductor 236 (of the output stage 230) is coupled between the cathodes of the diodes 232 and 234 and the output terminal 240. A bulk capacitor 238 is coupled between the output terminal 240 and ground.

The diode 232 functions as a half wave rectifier that presents a rectified alternating voltage to filtering circuitry that includes the diode 234, the inductor 236 and the capacitor 238 and behaves the same fashion as similar circuitry that is described above.

Figure 27:
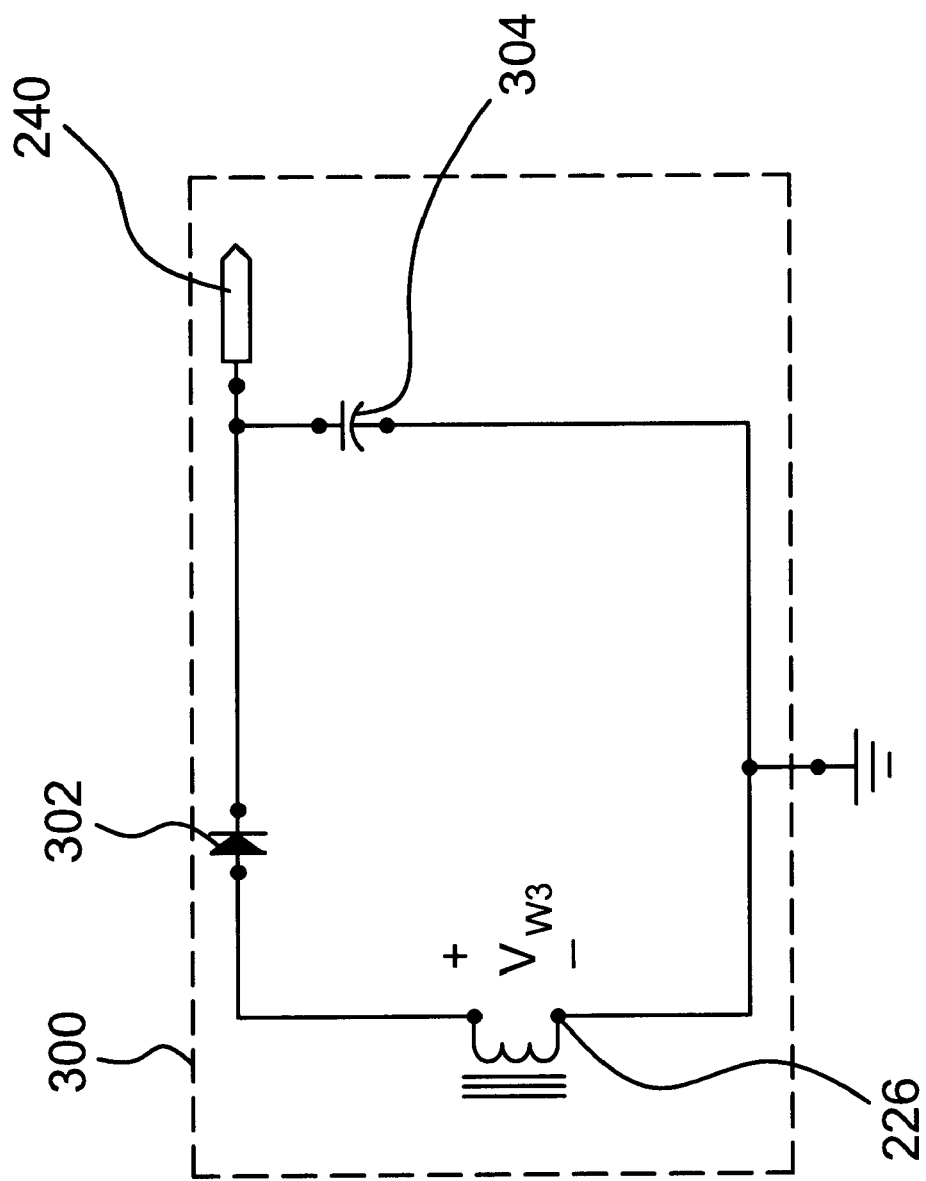
FIG. 27 is a schematic diagram of an alternative output stage for the regulator of FIG. 14 according to an embodiment of the invention.

Referring to FIG. 27, the output stage 230 may be replaced with a flyback output stage 300, in some embodiments of the invention. The output stage 230 includes a diode 302 that has its anode coupled to one terminal of the secondary winding 126 and its output terminal coupled to the output terminal 240. The other terminal of the secondary winding 126 is coupled to secondary side ground, and a bulk capacitor 304 is coupled between the output terminal 240 and secondary side ground.

In some embodiments of the invention, the regulator 200 may provide one or more voltages to components of a computer system. For example, the regulator 200 may provide one or more supply voltages to a processor (a microprocessor 280 (see FIG. 14), for example) of a computer system for purposes of powering the processor.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A voltage regulator comprising:
   a transformer having a primary side and a secondary side;
   at least one switch coupled to the primary side of the transformer to open and close to transfer energy to the transformer; and
   a plurality of output stages coupled to the secondary side of the transformer to receive energy from the transformer and provide output voltages, the output stages preventing current from flowing through said at least one switch during time intervals in which said at least one switch transitions from being open to being closed.

2. The voltage regulator of claim 1, wherein at least one of said at least one switches is coupled between the primary winding and a ground.

3. The voltage regulator of claim 2, further comprising:
   a capacitor coupled between the primary winding and ground to communicate energy with the transformer when said at least one of said at least one switches is open.

4. The voltage regulator of claim 3, wherein the capacitor limits a voltage across said one of said at least one switches.

5. The voltage regulator of claim 3, wherein the capacitor maintains a voltage across said one of said at least one switches near zero volts when said one of said at least one switches transitions from being closed to being open.

6. A method comprising:
   operating a switch to communicate energy to a plurality of output stages coupled to a secondary side of a transformer to generate output voltages; and
   preventing energy from being communicated from the transformer to the output stages during time intervals in which the switch transitions from being open to being closed to prevent current from flowing through the switch during the time intervals.

7. The method of claim 6, further comprising:
   using a capacitor coupled to a primary winding of the transformer to communicate energy with the transformer when the switch is open.

8. The method of claim 7, further comprising:
   using the capacitor to limit a voltage across the switch.

9. A system comprising:
   a processor; and
   a voltage regulator coupled to the processor to provide power to the processor, the voltage regulator comprising:
      an inductive element;
      at least one switch to open and close to energize and de-energize the inductive element; and
      a plurality of output stages coupled to the inductive element to receive energy from the inductive element to provide output voltages, the output stages preventing current from flowing through said at least one switch during time intervals in which said at least one switch transitions from being open to being closed.

10. A voltage regulator comprising:
    a transformer having a primary side and a secondary side;
    an output stage coupled to the secondary side of the transformer to provide a DC output voltage;
    at least one capacitor coupled to the primary side of the transformer to transfer stored energy to the transformer;
    an inductor;
    a switch coupled to the inductor, the switch opening and closing to store energy in the inductor and transfer energy from the inductor to said at least one capacitor to produce the stored energy in said at least one capacitor; and
    a circuit coupled to said at least one capacitor to couple said at least one capacitor across the switch to limit a voltage across the switch when the switch is open.

11. The voltage regulator of claim 10, further comprising:
    a controller to close the switch to store energy in the inductor and open the switch to transfer energy from the inductor to said at least one capacitor.

12. The voltage regulator of claim 10, wherein
    said the primary side of the transformer comprises a first primary winding and a second primary winding, and
    said at least one capacitor comprises a first capacitor to transfer energy to the first primary winding when the switch is closed and a second capacitor to transfer energy to the second primary winding when the switch is closed.

13. The voltage regulator of claim 10, wherein the inductor comprises a first inductor terminal receiving an input voltage and a second inductor terminal coupled to said at least one capacitor, and
    the switch is coupled between the second inductor terminal and ground.

14. The voltage regulator of claim 10, wherein the switch comprises a transistor.

15. The voltage regulator of claim 10, wherein the circuit comprises a diode.

16. A method comprising:
    opening and closing a switch to transfer energy from an input source to an inductor and transfer the energy from the inductor to at least one capacitor;
    transferring the energy from said at least one capacitor to a primary side of a transformer to produce an output voltage in an output stage coupled to a secondary side of the transformer; and
    when the switch is open, coupling said at least one capacitor in parallel with the switch to limit a voltage across the switch.

17. The method of claim 16, wherein the primary side of the transformer comprises a first primary winding and a second primary winding and the transferring comprises:
    using a first capacitor to transfer energy to the first primary winding when the switch is closed and a second capacitor to transfer energy to the second primary winding when the switch is closed.

18. A system comprising:

a processor; and a voltage regulator coupled to provide an output voltage to the processor, the voltage regulator comprising:
  an inductive element;
  an output stage coupled to the inductive element to provide the output voltage;
  at least one capacitor coupled to the inductive element to transfer energy stored in the inductive element to the output stage;
  a switch to open to energize the inductive element and close to de-energize the inductive element to transfer energy from the inductive element to said at least one capacitor; and
  a circuit to couple said at least one capacitor across the switch to limit a voltage across the switch when the switch is open.

19. The system of claim 18, further comprising:

a transformer having a secondary winding coupled to the output stage, a first primary winding and a secondary winding, wherein said at least one capacitor comprises a first capacitor to transfer energy to the first primary winding when the switch is closed and a second capacitor to transfer energy to the second primary winding when the switch is closed.

20. A voltage regulator comprising:

a transformer having a primary side and a secondary side;

at least one switch coupled to the primary side of the transformer to open and close to transfer energy to the transformer, said at least one switch including a control terminal to receive a signal capable of indicating a state-to cause said at least one switch to close; and a plurality of output stages coupled to the secondary side of the transformer to receive energy from the transformer and provide output voltages, the output stages preventing current from flowing through said at least one switch during time intervals in which the signal indicates the state.

21. The voltage regulator of claim 20, wherein each time interval begins when the signal first indicates the state.

22. The voltage regulator of claim 20, wherein at least one of said at least one switches is coupled between the primary winding and a ground.

23. The voltage regulator of claim 22, further comprising:

a capacitor coupled between the primary winding and ground to communicate energy with the transformer when said at least one of said at least one switches is open.

24. The voltage regulator of claim 23, wherein the capacitor limits a voltage across said one of said at least one switches.

25. The voltage regulator of claim 23, wherein the capacitor maintains a voltage across said one of said at least one switches near zero volts when said one of said at least one switches transitions from being closed to being open.

26. A voltage regulator comprising:

a transformer having a primary side and a secondary side;

at least one switch coupled to the primary side of the transformer to open and close to transfer energy to the transformer; and a plurality of output stages coupled to the secondary side of the transformer to receive energy from the transformer and provide output voltages, the output stages preventing current from flowing through said at least one switch during time intervals in which said at least one switch transitions from being open to being closed and wherein at least one of the plurality of output stages comprises a current blocking circuit to block the transfer of energy from the transformer to said at least one of the plurality of output stages during the time intervals.

27. The voltage regulator of claim 26, wherein the current blocking circuit comprises:

a magnetic amplifier to prevent the output circuit from receiving current from the transformer during the time intervals.

28. The voltage regulator of claim 27, wherein the magnetic amplifier comprises:

a coil.

29. The voltage regulator of claim 26, wherein at least one of said at least one switches is coupled between the primary winding and a ground.

30. The voltage regulator of claim 29, further comprising:

a capacitor coupled between the primary winding and ground to communicate energy with the transformer when said at least one of said at least one switches is open.

31. The voltage regulator of claim 30, wherein the capacitor limits a voltage across said one of said at least one switches.

32. The voltage regulator of claim 30, herein the capacitor maintains a voltage across said one of said at least one switches near zero volts when said one of said at least one switches transitions from being closed to being open.

33. A method comprising:

operating a switch to communicate energy to a plurality of output stages coupled to a secondary side of a transformer to generate output voltages; and preventing energy from being communicated from -the transformer to the output stages during time intervals in which the switch transitions from being open to being closed to prevent current from flowing through the switch during the time intervals, wherein the preventing comprises for each output stage, blocking current from being communicated from the transformer to the output stage during the time intervals.

34. The method of claims 33, further comprising:

using a capacitor coupled to a primary winding of the transformer to communicate energy with the transformer when the switch is open.

35. The method of claim 34, further comprising:

using the capacitor to limit a voltage across the switch.

36. A system comprising:

a processor; and a voltage regulator coupled to the processor to provide power to the processor, the voltage regulator comprising:
  an inductive element;
  at least one switch to open and close to energize and de-energize the inductive element; and
  a plurality of output stages coupled to the inductive element to receive energy from the inductive element to provide output voltages, the output stages preventing current from flowing through said at least one switch during time intervals in which said at least one switch transitions from being open to being closed and at least one of the plurality of output stages comprises a current blocking circuit to block the transfer of energy from the transformer to said at least one of the plurality of output stages during the time intervals.

37. The method of claim 36, wherein the current blocking circuit comprises:
a magnetic amplifier to prevent the output circuit from receiving current from the transformer during the time intervals.

38. A voltage regulator comprising:
a transformer having a primary side and a secondary side;
at least one switch coupled to the primary side of the transformer to open and close to transfer energy to the transformer, said at least one switch including a control terminal to receive a signal capable of indicating a state to cause the switch to close; and
a plurality of output stages coupled to the secondary side of the transformer to receive energy from the transformer and provide output voltages, the output stages preventing current from flowing through said at least one switch during time intervals in which the signal indicates the state and wherein at least one of the plurality of output stages comprises a current blocking circuit to block the transfer of energy from the transformer to said at least one of the plurality of output stages during the time intervals.

39. The voltage regulator of claim 38, wherein the current blocking circuit comprises:
a magnetic amplifier to prevent the output circuit from receiving current from the transformer during the time intervals.

40. The voltage regulator of claim 38, wherein each time interval begins when the signal first indicates the state.

41. The voltage regulator of claim 38, wherein
at least one of said at least one switches is coupled between the primary winding and a ground.

42. The voltage regulator of claim 41, further comprising:
a capacitor coupled between the primary winding and ground to communicate energy with the transformer when said at least one of said at least one switches is open.

43. The voltage regulator of claim 42, wherein the capacitor limits a voltage across said one of said at least one switches.

44. The voltage regulator of claim 42, wherein the capacitor maintains a voltage across said one of said at least one switches near zero volts when said one of said at least one switches transitions from being closed to being open.

\* \* \* \* \*